United States Patent

[11] 3,616,206

| [72] | Inventors | Ikuo Nogami<br>Kyoto;<br>Michio Katsumata, Kobe; Akira Imada,<br>Nishinomiya; Makoto Kida, Fuse;<br>Masahiko Yoneda, Suita, all of Japan |
|------|-----------|---|
| [21] | Appl. No. | 576,867 |
| [22] | Filed | Sept. 2, 1966 |
| [45] | Patented | Oct. 26, 1971 |
| [73] | Assignee | Takeda Chemical Industries, Ltd.<br>Osaka, Japan |
| [32] | Priority | Sept. 4, 1965 |
| [33] | | Japan |
| [31] | | 40/54361 |

[54] METHOD FOR THE PRODUCTION OF INOSINE
5 Claims, No Drawings

[52] U.S. Cl...................................................... 195/28 N
[51] Int. Cl........................................................C12d 13/06
[50] Field of Search............................................ 195/28 N

[56] References Cited
UNITED STATES PATENTS 3,111,459  11/1963  Motozaki et al..............  195/28 N

*Primary Examiner*—Alvin E. Tanenholtz
*Attorney*—Wenderoth, Lind & Ponack

ABSTRACT: Method for the production of inosine which comprises inoculating an adenine and amino acid-double requiring mutant such as *Bacillus pumulis* Gottheil No. 3218 (ATCC No. 21005), onto a culture medium containing adenine source and amino acid source, incubating the culture medium until inosine is accumulated and recovering inosine from the culture medium.

METHOD FOR THE PRODUCTION OF INOSINE

This invention relates to a method for the production of inosine. More particularly, this invention relates to a method for the production of inosine, which comprises inoculating an adenine- and amino acid-double requiring mutant derived from *Bacillus pumulis* Gottheil onto a culture medium containing adenine source and amino acid source, incubating the culture medium until inosine is accumulated therein, and recovering so accumulated inosine from the culture medium.

According to the present invention, the incubation of certain mutants derived from *Bacillus pumilus* Gottheil brings about accumulation of inosine in a remarkably large amount in the culture medium and inosine accumulated in this way is easily recoverable from the culture medium. The said mutants cannot grow on a minimal culture medium such as that mentioned in table 1 on which parental strains of the mutants can grow, but the mutants can grow on a culture medium prepared by the addition to the minimal culture medium of both an adenine source and an amino acid source such as amino acid itself, e.g., histidine, methionine, phenylalanine, tryptophane, aspartic acid, lysine, threonine, valine, alanine, cystine, leucine; in other words, the mutants are adenine- and amino acid-double requiring mutants.

TABLE 1 (MINIMAL CULTURE MEDIUM

| | |
|---|---|
| glucose | 50.0 g. |
| $(NH_4)_2HPO_4$ | 25.0 g. |
| $KH_2PO_4$ | 15.0 g. |
| NaCl | 50.0 g. |
| $MgSO_4 \cdot 7H_2O$ | 1.0 g. |
| biotin | 0.1 mg. |
| distilled water | 1 l. pH 7.0 |

The object of this invention is to provide a method for producing inosine, which can be put efficiently into practice on an industrial scale with a good yield. This object is realized by inoculating an adenine- and amino acid-double requiring mutant derived from *Bacillus pumilus* Gottheil in a culture medium containing an adenine source and an amino acid source, and incubating the culture medium. (Hereinafter the mutant mentioned above is referred to as "adenine- and amino acid-double requiring mutant(s) of this invention.")

Adenine- and amino acid-double requiring mutant of this invention is derived by means of a per se conventional technique for the mutation of micro-organisms. More concretely stated, wild-type strains of *Bacillus pumulus* Gottheil are treated, for example, with ultraviolet light, X-rays, γ-rays, nitrogen mustard, nitrous acid, nitroso-guanidine, etc. Preferably, adenine- and amino acid-double requiring mutant of this invention can be derived from *Bacillus pumilus* Gottheil by the following procedure.

Two groups of adenine-requiring mutants, i.e., one group of adenine-requiring mutants which are capable of accumulating inosine in a culture medium and other group of adenine-requiring mutants which are substantially unable to accumulate inosine in a culture medium, are obtained by applying the above-mentioned technique for the mutation of micro-organisms to wild-type strains of *Bacillus pumilus* Gottheil. By further applying the technique for mutation to these adenine-requiring mutants, adenine- and amino acid-double requiring mutants capable of accumulating a remarkably large amount of inosine can be derived, even when the adenine-requiring mutants are those which substantially cannot accumulate inosine.

Adenine- and amino acid-double requiring mutants of this invention include *Bacillus pumilus* Gottheil No. 3218 (ATCC No. 21005), *Bacillus pumilus* Gottheil No. 2475 (ATCC No. 21006), *Bacillus pumilus* Gottheil No. 158-L-119 (ATCC No. 21007), and *Bacillus pumilus* Gottheil No. 182-H-86 (ATCC No. 21008).

For the purpose of the industrial production of inosine by incubating adenine- and amino acid-double requiring mutant of this invention, it is in general preferable to use a liquid culture medium.

Generally, the incubation is carried out either under static conditions or in a submerged process under aeration and/or agitation, employing a culture medium necessarily containing both an adenine source and an amino acid source.

Desirably, the medium may contain assimilable carbon source(s) and digestible nitrogen source(s).

As the adenine source, there are exemplified adenine itself, a compound which contains adenine component in its molecule and is easily convertible into adenine, or a natural substance containing the latter compound. For example, there may be employed adenine, adenosine, 3'-adenylic acid, meat extract, cornsteep liquor, polypeptone, or yeast extract, etc.

As the amino acid source, there may be employed amino acid itself such as histidine, methionine, phenylalanine, tryptophane, aspartic acid, lysine, threonine, valine, alanine, cystine, or leucine; peptide; or a natural substance containing such an amino acid as above and/or a peptide such as casein hydrolysate, meat extract, polypeptone or yeast extract, etc.

Natural substances containing an adenine source as well as amino acid source, e.g., soybean meal, meat extract, yeast extract, polypeptone, etc. are also generally employable.

As the assimilable carbon source, one or more of the compounds, e.g., starch, dextrin, sucrose, lactose, maltose, glucose, glycerol, etc. may be used, and various organic compounds or organic materials such as organic ammonium salts, organic nitrates, urea, etc. may be used not only as the carbon source but also as digestible nitrogen source in the same way as inorganic nitrogen source, for example, inorganic ammonium salts such as ammonium sulfate, ammonium carbonate, ammonium phosphate, or various kinds of nitrates such as sodium nitrate, potassium nitrate, etc. Furthermore, a small quantity of inorganic salts such as sodium chloride, phosphates, salts of metals such as calcium, zinc, manganese, iron may be added to the medium. And, if desired, other conventional nutrient factors, such as vitamins, may be added.

Especially desirably, the medium may contain about 0.2 percent to about 5 percent (weight/volume) of water-insoluble calcium salt of phosphoric acid (i.e., secondary calcium phosphate, tertiary calcium phosphate or a mixture thereof), because a larger amount of inosine is accumulated in the medium when adenine- and amino acid-double requiring mutant of this invention is incubated in such a medium, than when incubated in an ordinary culture medium.

Adenine source and amino acid source should be added to the culture medium in a sufficient amount for the growth of the adenine- and amino acid-double requiring mutant of this invention. Generally, an adenine source is added to the culture medium so as to make its concentration from about 5 mg./l (milligrams per liter) to about 500 mg./l when calculated in terms of adenine. The amino acid source is preferably added to the culture medium so as to make its concentration from about 50 mg./l to about 5 g./l when calculated in terms of amino acid itself.

Incubation conditions such as the pH of the medium and the incubation temperature should be controlled so as to accumulate inosine in the maximum amount. Generally, the initial pH of the culture medium and the incubation temperature are respectively adjusted to 5.5–8.5 and to 25° C. to 45° C.

Under the above-mentioned culture conditions, the desired inosine is produced and accumulated in the culture medium with the lapse of time.

Incubation is continued until the maximum amount of inosine is accumulated in the culture medium. Although the period required for the maximum accumulation of inosine is changeable depending upon various factors, generally the amount of the desired inosine accumulated in the culture medium reaches a maximum usually between the 2nd and 10th day from the start of the incubation.

Inosine accumulated in the culture medium may be recovered by simple procedures, e.g., those employing activated charcoal, etc.

Following examples are merely intended to illustrate presently preferred embodiments of this invention and not to restrict the scope thereof.

In the present specification as well as in the following examples, the abbreviations γg., mg., g., ml., l. and °C. refer respectively to microgram(s), milligram(s), gram(s), milliliter(s), liter(s) and degrees centigrade. Ratios and percentages are volume/volume unless otherwise described.

EXAMPLE 1

Adenine-requiring mutant, capable of accumulating inosine, Bacillus pumilus Gottheil No. 32, is derived from Bacillus pumilus Gottheil by irradiation with ultraviolet light (15 watt) for 5 minutes from a height of 50 cm., followed by subjecting to penicillin screening (Experientia, 66, 41 (1960)) and to replica plating method (Journal of Bacteriology, 63, 399 (1952)). Thus obtained Bacillus pumilus Gottheil No. 32 is further subjected to irradiation with ultraviolet light, penicillin screening and replica plating method after the manner described just above to obtain adenine- and histidine-double requiring mutant, Bacillus pumilus Gottheil No. 3218 (ATCC No. 21005).

Thus obtained Bacillus pumilus Gottheil No. 3218 (ATCC No. 21005) is inoculated on 500 ml. of the culture medium mentioned below as table 2, and this is followed by incubation under shaking at 28° C. for 18 hours:

TABLE 2

| | |
|---|---|
| glucose | 80 g. |
| sodium citrate | 10 g. |
| (NH$_4$)$_2$HPO$_4$ | 10 g. |
| KCl | 1.5 g. |
| MgSO$_4$·7H$_2$O | 0.5 g. |
| yeast extract | 5 g. |
| biotin | 200 $\mu$g. |
| distilled water | 1 l. pH 7.0 |

The resultant culture broth is inoculated on 50 liters of the culture medium of the same composition as mentioned just above, and incubated with aeration and agitation at 28° C. for 120 hours, whereby 8.5 mg./ml. of inosine is accumulated. From the culture broth 320 g. of inosine is obtained with the acid of activated charcoal.

EXAMPLE 2

Adenine- requiring mutant capable of accumulating inosine, Bacillus pumilus Gottheil No. 24, is derived from Bacillus pumilus Gottheil by irradiation with ultraviolet light (15 watt) for 4 minutes from a height of 50 cm., followed by penicillin-screening (described above) and replica-plating method (described above).

Thus obtained Bacillus pumilus Gottheil No. 24 is further subjected to irradiation with ultraviolet light, penicillin-screening and replica-plating method after the manner described just above to obtain adenine- and phenylalanine-double requiring mutant, Bacillus pumilus Gottheil No. 2475, (ATCC No. 21006).

Thus obtained Bacillus pumilus Gottheil No. 2475 (ATCC No. 21006) is inoculated on 100 ml. of the culture medium mentioned below as table 3, and this is followed by incubation under shaking at 28° C. for 24 hours:

TABLE 3

| | |
|---|---|
| glucose | 60 g. |
| dry yeast | 10 g. |
| (NH$_4$)$_2$SO$_4$ | 12.5 g. |
| MgSO$_4$·7H$_2$O | 1 g. |
| CaCO$_3$ | 20 g. |
| adenine | 20 mg. |
| peptone | 3 g. |
| Ca(H$_2$PO$_4$)$_2$ | 2.5 g. |
| Ca$_3$(PO$_4$)$_2$ | 7.5 g. |
| distilled water | 1 l. pH 7.5 |

The resultant culture broth is inoculated on 100 liters of the culture medium mentioned below as table 4 and incubated with aeration and agitation at 28° C. for 96 hours, whereby 11.5 mg./ml. of inosine is accumulated. From the culture broth 900 g. of inosine is obtained with the aid of activated charcoal.

TABLE 4

| | |
|---|---|
| glucose | 60 g. |
| dry yeast | 10 g. |
| NH$_4$Cl. | 15 g. |
| MgSO$_4$·7H$_2$O | 50 g. |
| Ca$_3$(PO$_4$)$_2$ | 12 g. |
| CaCo$_3$ | 15 g. |
| distilled water | 1 l. pH 7.3 |

EXAMPLE 3

Adenine- requiring mutant, which is substantially unable to accumulate inosine, Bacillus pumilus Gottheil No. 158, is derived from Bacillus pumilus Gottheil by irradiation with ultraviolet light (15watt) for 5 minutes from a height of 50 cm., followed by penicillin-screening (described above) and replica-plating method (described above). Thus obtained Bacillus pumilus Gottheil No. 158 is further subjected to irradiation with ultraviolet light, penicillin-screening and replica-plating method after the manner described just above to obtain adenine- and tryptophane-double requiring mutant, Bacillus pumilus Gottheil No. 158–L–119 (ATCC No. 21007).

Thus obtained Bacillus pumilus Gottheil No. 158–L–119 (ATCC No. 21007) is inoculated on 500 ml. of the culture medium mentioned below as table 5, and this is incubated under shaking at 28° C. for 20 hours.

TABLE 5

| | |
|---|---|
| glucose | 80 g. |
| sodium citrate | 10 g. |
| (Nh$_4$)$_2$HPO$_4$ | 10 g. |
| KCl | 1.5 g. |
| MgSO$_4$·7H$_2$O | 0.5 g. |
| Yeast extract | 5 g. |
| biotin | 10 mg. |
| distilled water | 1 l. pH 7.5 |

The resultant culture broth is inoculated on 30 liters of the culture medium of the same composition as in table 5, and incubated with aeration and agitation at 28° C. for 120 hours, whereby 9.2 mg./ml. of inosine is accumulated. From the culture broth 213 g. of inosine is obtained with the aid of activated charcoal.

EXAMPLE 4

Adenine-requiring mutant which is substantially unable to accumulate inosine, Bacillus pumilus Gottheil No. 182–H, is derived from Bacillus pumilus Gottheil by irradiation with ultraviolet light (15 watt) for 3 minutes from a height of 50 cm., followed by penicillin-screening (described above) and replica-plating method (described above).

Thus obtained *Bacillus pumilus* Gottheil No. 182 is further subjected to irradiation with ultraviolet light, penicillin-screening and replica-plating method after the manner described just above to obtain adenine- and methionine- double requiring mutant, *Bacillus pumilus* Gottheil No. 182–H–86, (ATCC No. 21008).

Thus obtained *Bacillus pumilus* Gottheil No. 182–H–186 (ATCC No. 21008) is inoculated on 100 ml. of the culture medium of the same composition as described in table 3 and incubated under shaking at 28° C. for 24 hours.

The resultant culture broth is inoculated on 100 liters of the culture medium of the same composition as described in table 4, and incubated with aeration and agitation at 28° C. for 96 hours, whereby 12.1 mg./ml. of inosine is accumulated. From the culture broth 965 g. of inosine is obtained with the aid of activated charcoal.

Having thus disclosed the invention, what is claimed is:

1. A method for the production of inosine, which comprises inoculating an adenine- and amino acid-double requiring mutant of a member selected from the group consisting of *Bacillus pumilus* Gottheil No. 3218 (ATCC No. 21005), *Bacillus pumilus* Gottheil No. 2475 (ATCC No. 21006), *Bacillus pumilus* Gottheil No. 158–L–119 (ATCC No. 21007) and *Bacillus pumilus* Gottheil No. 182–H–86 (ATCC No. 21008) onto a culture medium containing adenine source and amino acid source, incubating the culture medium until inosine is accumulated therein, and recovering inosine so accumulated from the culture medium.

2. A method according to claim 1, wherein the mutant is *Bacillus pumilus* Gottheil No. 3218 (ATCC No. 21005).

3. A method according to claim 1, wherein the mutant is *Bacillus pumilus* Gottheil No. 2475 (ATCC No. 21006).

4. A method according to claim 1, wherein the mutant is *Bacillus pumilus* Gottheil No. 158–L–119 (ATCC No. 21007).

5. A method according to claim 1, wherein the mutant is *Bacillus pumilus* Gottheil No. 182–H–86 (ATCC No. 21008).

* * * * *